United States Patent [19]

Hosokawa et al.

[11] Patent Number: 4,789,105

[45] Date of Patent: Dec. 6, 1988

[54] PARTICULATE MATERIAL TREATING APPARATUS

[75] Inventors: Masuo Hosokawa, Toyonaka; Akio Tanaka; Keiichiro Kohmitsu, both of Hirakata; Tohei Yokoyama, Kyoto; Kiyoshi Urayama, Yawata; Sadamitsu Matsuo, Izumi; Masashi Kato, Ibaragi, all of Japan

[73] Assignee: Hosokawa Micron Corporation, Osaka, Japan

[21] Appl. No.: 39,140

[22] Filed: Apr. 16, 1987

[30] Foreign Application Priority Data

Apr. 18, 1986 [JP] Japan .............................. 61-90793
Aug. 7, 1986 [JP] Japan .............................. 61-186642
Dec. 22, 1986 [JP] Japan .............................. 61-305982

[51] Int. Cl.$^4$ ............................................ B02C 19/00
[52] U.S. Cl. ........................................ 241/67; 241/80; 241/119
[58] Field of Search ............... 241/65, 66, 67, 79.1, 241/117–121, 80, 97

[56] References Cited

U.S. PATENT DOCUMENTS 2,610,802  9/1952  McIluaine .................. 241/121 X
2,650,034  8/1953  Wiemer ...................... 241/67
4,529,135  7/1985  Urayama .................. 241/121 X
4,684,069  8/1987  Hashimoto et al. ......... 241/119 X

FOREIGN PATENT DOCUMENTS 153544  9/1983  Japan .
43216   3/1984  Japan .
8735    1/1986  Japan .

Primary Examiner—Mark Rosenbaum
Attorney, Agent, or Firm—Edwin E. Greigg

[57] ABSTRACT

An apparatus for treating a particulate material comprising a casing defining a treating chamber and rotatable at high speed to produce a centrifugal force for pressing the material in the casing against an inside wall surface of the casing. Treating members such as pulverizing members are disposed in the casing for revolution relative to the inside wall surface of the casing. The treating chamber has a discharge opening for permitting overflows of the material under treatment. The discharge opening is disposed adjacent a center of rotation of the casing, and a limiting device is provided adjacent the discharge opening for limiting the overflows of the material under treatment. A classifier is provided to communicate with the discharge opening of the treating chamber for receiving treated material.

15 Claims, 13 Drawing Sheets

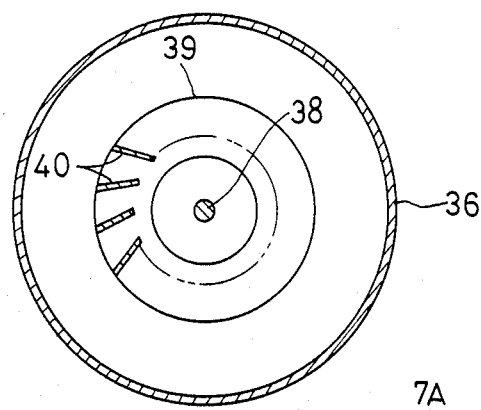
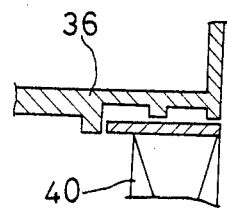
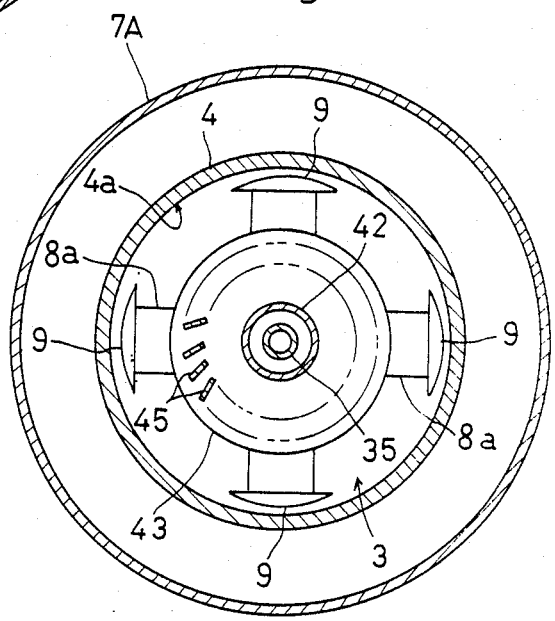
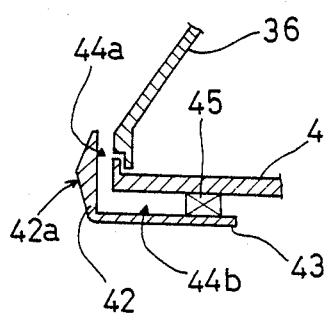

PARTICULATE MATERIAL TREATING APPARATUS

BACKGROUND OF THE INVENTION

The present invention relates to an apparatus for treating various types of particulate material in various ways, specifically pulverizing, mixing, granulating, coating and otherwise treating such materials. This apparatus comprises a casing defining a treating chamber having a discharge opening for permitting overflows of the material under treatment, drive means for rotating the casing at high speed to produce a centrifugal force for pressing the material in the casing against an inside wall surface of the casing, treating members diposed in the casing to be rotatable relative to the inside wall surface of the casing, a classifier communicating with the discharge opening.

A known treating apparatus having a construction as noted above, taking a pulverizing or crushing apparatus for example, is disclosed in U.S. Pat. No. 4,529,135 (or Japanese patent application laid open under No. 58-153544).

According to the known construction, however, the treating chamber defined by the rotatable casing is open substantially over an entire top area thereof, and this opening provides an overflow outlet for the material under treatment. Therefore, it is possible for a considerable amount of material not sufficiently treated, namely coarse particles not reduced to fine particles, to leave the treating chamber as entrained in gas flows along with fine particles. Since coarse particles naturally require a much higher conveying gas speed than fine particles, a great amount of gas must be supplied from a gas supply unit which raises the power cost for supplying the gas. Furthermore, the classifier receiving the material from the treating chamber must undergo a heavy workload, and its classifying precision tends to be poor because of a wide distribution of particle sizes. Thus, the known construction has room for improvement.

Moreover, the crusher and the classifier in the known construction are separate entities, wherein the discharge outlet of the crusher is connected to the inlet of the classifier by a pipe, and the coarse particle outlet of the classifier is connected to the inlet of the crusher by another pipe. This constitutes the further disadvantage of the prior art that the entire installation tends to be large. The course particles returning from the classifier are no longer very coarse since they have undergone at least one cycle of treatment. Since such particles are mixed with fresh untreated material for feeding to the crushing chamber, the crushing efficiency is somewhat poor with respect to the coarse particles returning from the classifier. The known construction remains to be improved in this respect also.

A known treating apparatus for mixing, granulating and drying particulate materials is disclosed in Japanese patent publication No. 59-43216. A known treating apparatus for coating particulate materials is disclosed in Japanese patent publication No. 61-8735.

Demands for treating apparatus of this type are expected to grow at an increasing rate in the fields of medicines, foods, cosmetics, and new materials such as ceramics. However, conventional treating apparatus including those disclosed in the foregoing publications are not satisfactory.

SUMMARY OF THE INVENTION

A primary object of the present invention is to provide an improved treating apparatus which greatly reduces the amount of untreated material discharged from the treating chamber, thereby to save power consumption and improve the classifying precision.

In order to achieve the above object, a treating apparatus according to the present invention has the characterizing feature in that the discharge opening is disposed adjacent a center of rotation of the casing, and limiting means is provided adjacent the discharge opening for limiting the overflows of the material under treatment.

Since the overflow discharge opening is disposed adjacent the center of rotation of the casing, the particles of material under treatment are classified to a certain extent by the conveying action of gas currents flowing toward the discharge opening and the centrifugal force produced by rotation of the casing. Therefore, those particles of material reduced in size through the treatment are directed toward the discharge opening in an efficient manner. The limiting means for limiting the overflows of the material is effective to minimize discharge of uncrushed part of the material and permit sufficiently treated part of the material to proceed to the classifier efficiently.

Consequently, the amount of gas supplied from the gas supplying unit is drastically reduced, which results in power cost saving for the gas supplying unit, and hence a considerable reduction in running cost of the apparatus. The classifier may also be small and inexpensive.

Furthermore, the construction according to the present invention permits the classifier to classify the particles with greatly improved precision, which is attributable to the combined effect of drastic reduction in the amount of material to be classified by the classifier and in the particle size distribution. The present invention, therefore, provides a treating apparatus capable of assuring a sufficiently treated product and which is a significant improvement on the existing apparatus.

Another object of the invention is to provide an improvement for permitting the entire installation to be compact and coarse particles returning from the classifier to be treated with high efficiency.

In order to achieve this object, a treating apparatus according to the invention comprises, in addition to the foregoing features, a tubular partition defining the discharge opening and a ring-like partition continuous from a lower end of the tubular partition. The tubular partition includes an annular projection formed on an inside peripheral surface thereof to act as overflow limiting means. The two partitions are rotatable coaxially with and in the same direction as the casing. The classifier is directly connected to the casing, and a coarse particle return passage is defined around an outer periphery of the tubular partition for intercommunicating the classifier and the casing.

Thus, the classifier is in direct communication with the casing for receiving treated material entrained by gas currents from the discharge opening of the treating chamber without necessitating an additional pipeline. The coarse particle return passage defined peripherally of the tubular partition permits the coarse particles falling from the classifier to return to the treating chamber, again, without necessitating an additional pipeline. Therefore, the entire installation is much more compact than the prior art construction wherein the classifier and the crushing chamber are interconnected through two pipelines.

The ring-like partition receives the coarse particles falling through the return passage and discharges the coarse particles toward the inside peripheral wall surface of the casing by means of a centrifugal force produced by the rotation of the ring-like partition. This permits the coarse particles returning from the classifier, which are no longer very coarse, to be directed to the casing inside surface for immediate treatment by the treating members without becoming mixed with fresh fed, untreated material. Hence, the returning coarse particles are subjected to further treatment efficiently.

Consequently, the treating apparatus according to the present invention has the advantages of being compact and easy to install, and excellent in treating efficiency. This apparatus has excellent performance and is economical also.

A further object of the invention is to provide a treating apparatus capable of carrying out various operations efficiently and reliably, such operations including pulverizing, mixing, granulating, rounding, coating, and capsulating particulate materials.

Other objects and advantages of the invention will be apparent from the following description.

BRIEF DESCRIPTION OF THE DRAWINGS

The drawings illustrating particulate material treating apparatus embodying the present invention, in which:

FIG. 5 is a section taken on line IV—IV of FIG. 4, FIG. 6 is a section taken on line V—V of FIG. 4, FIGS. 7 and 8 are enlarged views of parts of the apparatus shown in FIG. 4, respectively, FIG. 14 is a section taken on line XIV—XIV of FIG. 13, FIGS. 15 through 22 are photographs taken with an electron microscope of particles of cosmetics and the like treated by the apparatus according to the seventh embodiment, in which:

DESCRIPTION OF THE PREFERRED EMBODIMENTS

Figure 1:
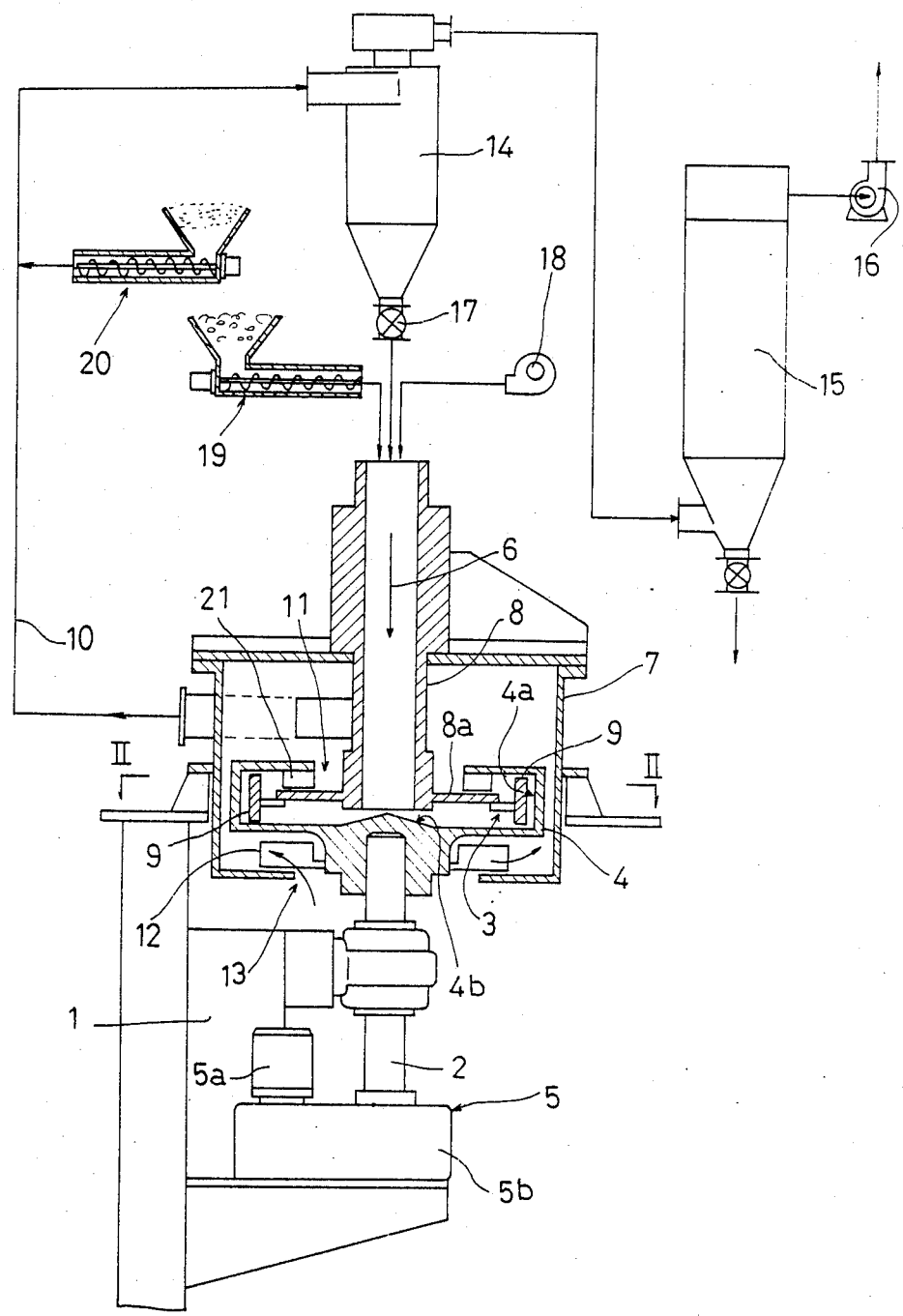
FIG. 1 is a schematic view, in vertical section, of a treating apparatus and peripheral equipment according to a first embodiment of the invention.
Figure 2:
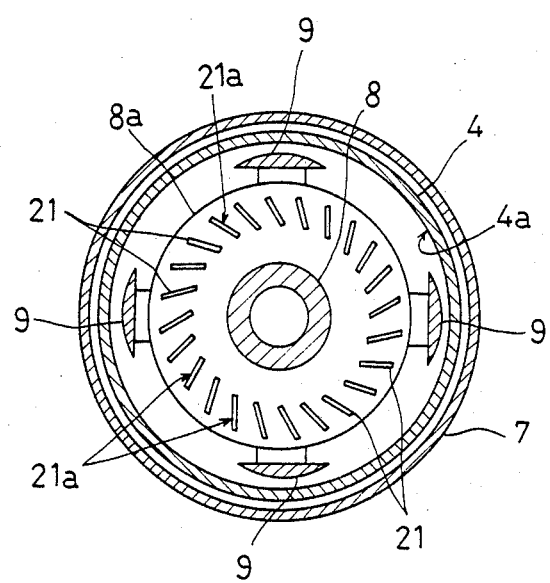
FIG. 2 is a section taken on line II—II of FIG. 1.

A first embodiment of the invention will be described hereinafter with reference to FIGS. 1 and 2.

The apparatus shown therein comprises a base 1, a vertical rotary shaft 2 attached to the base 1, and a pulverizing chamber 3 which is one example of treating chamber defined by a bottomed cylindrical rotary 4 concentrically mounted on an upper end of the rotary shaft 2. The rotary shaft 2 is driven by a drive mechanism 5 connected to a lower end thereof and consisting of an electric motor 5a and a speed changer 5b, whereby the casing 4 is rotatable to direct a material under treatment by centrifugal force against a peripheral inside wall surface 4a thereof. The rotational speed of the casing 4 is adjustable to impart an appropriate centrifugal force according to the characteristics of material to be treated.

The casing 4 defines a conical projection 4b on a bottom center portion, and a passage 6 is provided for feeding the material downwardly toward the conical projection 4b. The passage 6 is defined by a pipe 8 extending into the casing 4 and secured to an outer fixed cover housing 7 attached to the base 1. The casing 4 houses pulverizing fixed members 9 which are one example of treating members secured to the pipe 8 by means of a support 8a. These pulverizing members 9 treat the material in cooperation with the inside surface of the casing 4. The pulverizing members 9 define inclined surfaces approaching the casting 4 in the direction of rotation of casing 4. The casing 4 defines an overflow type discharge opening 11 at an upper center thereof for permitting discharge of only part of the material pulverized into ultrafine particles by the cooperation of the inside wall surface 4a of casing 4 and the pulverizing members 9 into a portion of the housing 7.

The casing 4 includes revolving classifying vanes 21 in a material passage extending from the inside surface 4a of casing 4 toward the central discharge opening 11 and adjacent the opening 11. These classifying vanes constitute one example of means for limiting overflows of the material. More particularly, the classifying vanes 21 are arranged over a whole circumference of the casing 4, and each vane defines a plane of action 21a inclined to be nearer to the inside surface 4a of casing 4 as it extends rearwardly with respect to the direction of rotation of the casing 4. Thus, the revolving classifying vanes 21 acts to uniformalize the velocity of air flows toward the discharge opening 11 and to limit the size of the overflows of pulverized material.

The casing 4 further includes fan blades 12 formed integrally therewith at a lower portion for drawing ambient air through a suction inlet 13 defined in the cover 7, thereby to cool the casing 4. The suction air ultimately flows, as pneumatic conveying medium for entraining pulverized material, into a material withdrawal passage 10 connected to the cover 7.

The withdrawal passage 10 extends to a suitable wind selection type classifier 14 such as a classifying cyclone 14, and then to a suitable ultrafine particle collector 15 such as an electric dust collector to which a suction blower 16 is connected. The classifier 14 has a coarse particle outlet connected via a rotary feeder 17 to the feed passage 6 to recirculate insufficiently pulverized particles for further pulverizing treatment.

A blower 18 for feeding a suitable amount of air, inert gas or the like, and a feeder 19 for feeding the material to be treated, are also connected to the feed passage 6. A further feeder 20 is connected to the withdrawal passage 10 for feeding thereinto a material pulverized in a separate process. Thus, the invention may employ an optimal feeding mode in accordance with the material to be treated.

Figure 3:
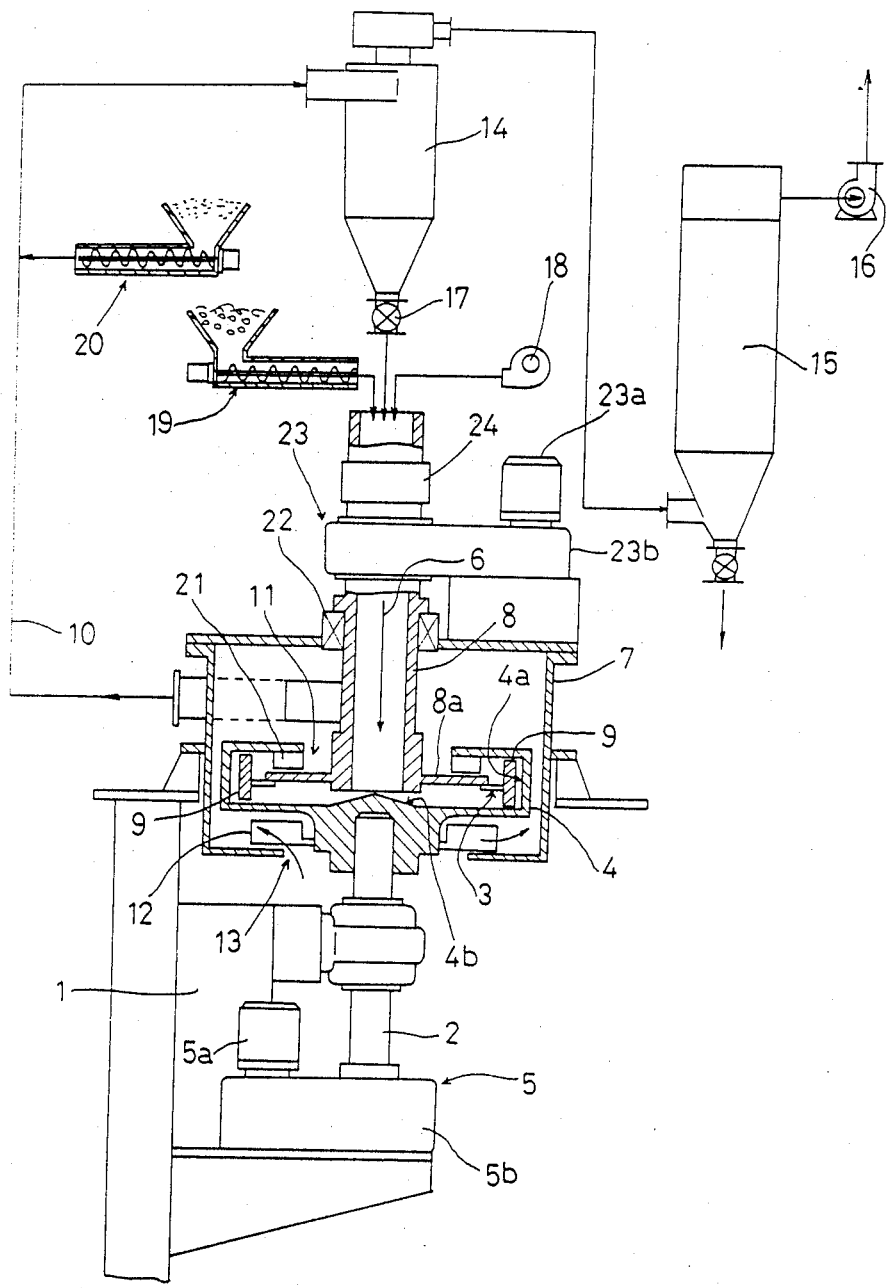
FIG. 3 is a schematic view, in vertical section, of a treating apparatus and peripheral equipment according to a second embodiment of the invention.
Figure 4:
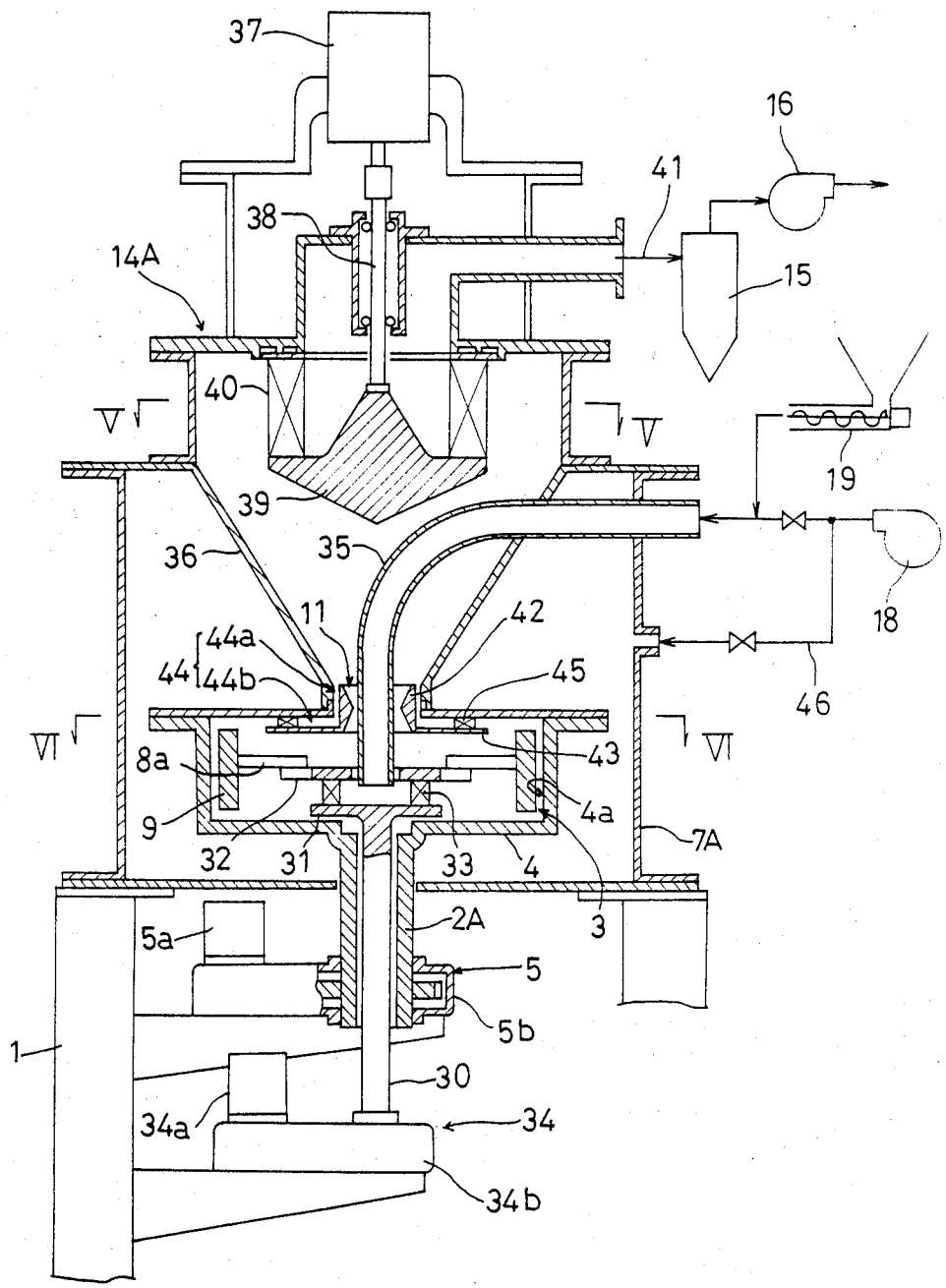
FIG. 4 is a schematic view, in vertical section, of a treating apparatus and peripheral equipment according to a third embodiment of the invention.

A second embodiment of the invention will be described hereinafter with reference to FIG. 3. Like references are affixed to like elements and description will not be repeated of the elements already described hereinbefore.

As distinct from the first embodiment, the pulverizing members 9 are driven to revolve in addition to the rotation of the casing 4 according to the second embodiment. Specifically, the pipe 8 is rotatably supported by a bearing 22 attached to the cover 7, the pipe 8 being driven by a drive mechanism 23 mounted on the cover 7 and consisting of an electric motor 23a and a speed changer 23b. The pipe 8 is driven to revolve the pulverizing members 9 coaxially with the casing 4, in the same direction with but at a slightly slower speed than the rotation of the casing 4. A rotary joint 24 is mounted between the pipe and the elements disposed upstream thereof, namely the rotary feeder 17, blower 18 and feeder 19.

It is not essential to revolve the pulverizing members 9 as described with relation to the first embodiment. However, the revolution of the pulverizing members 9 coaxially with and in the same direction as the rotation of the casing 4 according to the second embodiment provides the advantage that the casing 4 may be rotated at a very high speed to press the material against its inside wall surface 4a with a great pressing force. This does not result in the material being unduly agitated by the pulverizing members 9 since the pulverizing members 9 is revolvable in the same direction as the rotation of the casing 4 with a suitable speed difference. Therefore, a great centrifugal force may be applied to coarse particles of the material, and the pulverizing members 9 act to prevent the coarse particles from leaving the inside wall surface 4a of the casing 4. These features produce a combined effect for checking movement of the coarse particles toward the classifying vanes 21 thereby to improve classifying precision of the classifying vanes 21 and to permit the material to be reduced to ultrafine particles with high efficiency through the cooperation of the inside wall surface 4a of the casing 4 and the pulverizing members 9. The speeds of the casing 4 and pulverizing members 9 may suitably set according to the characteristics of the material to be treated, the inside diameter of the casing 4 and other conditions. Test results show that, under certain conditions, the rotating speed of the casing 4 should desirably be 10-50 m/sec. and the revolving speed of the pulverizing members 9, 1-30 m/sec., for example.

The classifying vanes 21 acting as means for limiting the overflows of material under treatment may be varied as appropriate with respect to their material, shape, number, mounting arrangement and so on. For example, the classifying vanes 21 may be stationary instead of being revolvable as already described. Revolvable classifying vanes 21 may be attached to a rotatable supporting member or may be driven by an exclusive drive mechanism to be revolvable with a suitable speed difference with respect to the rotatable casing 4. Their planes of action 21a may extending in suitable directions such as radially of the casing 4. It is, however, desirable for the efficiency of particulate material treatment that the classifying vanes 21 be driven to revolve at substantially the same speed as the casing 4 to avoid undue turbulence of gas currents in the casing 4. It is also desirable to arrange the planes of action 21a in suitable directions by taking the speeds and directions of the gas current into account, and not to greatly incline the planes of action 21a with respect to radial directions of the casing 4 in order to minimize collison with the material under treatment.

A third embodiment of the invention will be described hereinafter with reference to FIGS. 4 through 8.

The apparatus shown therein comprises a base 1, a vertical tubular rotary shaft 2A attached to the base 1, and a pulverizing chamber 3 which is one example of treating chamber defined by a bottomed cylindrical casing 4 concentrically mounted on an upper end of the tubular rotary shaft 2A. The tubular rotary shaft 2A is driven by a drive mechanism 5 connected to a lower end thereof and consisting of an electric motor 5a and a speed changer 5b, whereby the casing 4 is rotatable to direct a material under treatment by centrifugal force against a peripheral inside wall surface 4a thereof. The rotational speed of the casing 4 is adjustable to impart an appropriate centrifugal force according to the characteristics of material to be treated.

The base 1 supports a vertical rotary shaft 30 coaxially extending through the tubular rotary shaft 2A. The rotary shaft 30 carries a disk 31 coaxially mounted on an upper end thereof. The disk 31 supports through a plurality of vanes 33 a perforated disk 32 disposed above and concentrically with the disk 31. The casing 4 houses pulverizing members 9 which are one example of treating members secured to the perforated disk 32 by means of a support 8a. These pulverizing members 9 treat the material in cooperation with the inside surface of the casing 4. The pulverizing members 9 define inclined surfaces approaching the casing 4 in the direction of rotation of casing 4. A drive mechanism 34 consisting of an electric motor 34a and a speed changer 34b is operatively connected to a lower end of the rotary shaft 30 to drive the rotary shaft 30 so that the pulverizing members 9 are revolvable relative to the inside wall surface 4a of the casing 4 and in the same direction in which the casing 4 is rotatable. The revolving speed of the pulverizing members 9 is adjustable to cause the pulverizing members 9 to revolve relative to the inside wall surface 4a of the casing 4 with a suitable speed difference therebetween in accordance with the characteristics of the material to be treated.

A pipe 35 extends downwardly to a position above the center of the disk 31, the pipe 35 being connected to a blower 18 for feeding a suitable amount of air, inert gas or the like, and a feeder 19 for feeding the material to be treated. The material descending through the pipe 35 is directed to lower portions of the inside wall surface 4a of the casing 4 by a centrifugal force generated by the rotation of the disk 31 and the distributing action of the revolving vanes 33.

The casing 4 defines an overflow type discharge opening 11 at an upper center thereof for permitting gas-entrained discharge of only part of the material pulverized into ultrafine particles by the cooperation of the inside wall surface 4a of casing 4 and the pulverizing members 9.

The casing 4 is in communication with a classifier 14A having an upwardly diverging case 36. The case 36 houses, in an upper space thereof, a downwardly tapering conical member 39 attached to a rotary shaft 38 operatively connected to an electric motor 37. The conical member 39 includes a plurality of classifying vanes 40 arranged as shown in FIG. 5. The classifying vanes 40 surround a space in communication with a fine particle collecting passage 41. As shown in FIG. 7, the case 36 includes corrugations to provide seals between the case 36 and the classifying vanes 40. The fine particle collecting passage 41 is connected to a suitable ultrafine particle collector 15 such as an electric dust collector and to a suction blower 16 in the memtioned order.

The discharge opening 11 is defined by a tubular partition 42 which, as shown in FIG. 8, includes an annular projection 42a on an inside wall thereof constituting one example of overflow limiting means. The tubular partition 42 is continuous at a lower end thereof with a ring-like partition 43. A coarse particle return passage 44 is defined along an outer periphery of the tubular partition 42 and an upper surface of the ring-like partition 43. In other words, the tubular partition 42 defines the first half 44a of the coarse particle return passage 44, and the ring-like partition 43. defines the second half 44b of the return passage 44. As shown in FIG. 8, the ring-like partition 43 is secured to the casing 4 through a plurality of vanes 45 to be rotatable with the casing 4. Coarse particles thrown through the classifying vanes 40 and sliding down inside surfaces of the case 36 of the classifier 14A are received at the first half 44a of the coarse particle return passage 44 and are allowed to advance to the second half 44b continuous with the first half. Then, by the centrifugal force produced by the ring-like partition 43 and a throwing action of the vanes 45 the coarse particles are sent flying from an outlet of the ring-like partition 43, which outlet is opposed to the inside wall surface 4a of the casing 4, to upper portions of the inside wall surface 4a. Thus, the coarse particles are subjected to a further pulverizing treatment.

The casing 4 and the case 36 of the classifier 14A are surrounded by a cover 7A connected to a blower 18 through a passage 46 including a variable throttle. This prevents the particles from flowing out of the casing 4 and the case 36.

Figure 9:
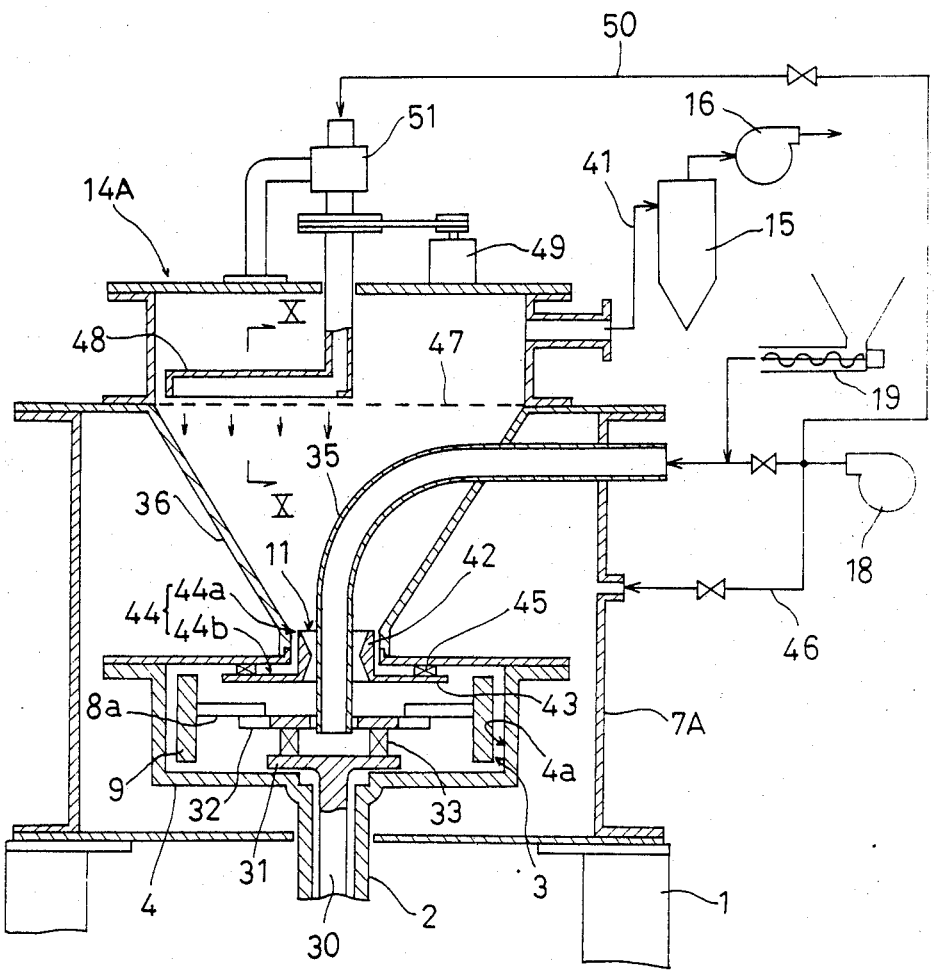
FIG. 9 is a schematic view, in vertical section, of a treating apparatus and peripheral equipment according to a fourth embodiment of the invention.
Figure 10:
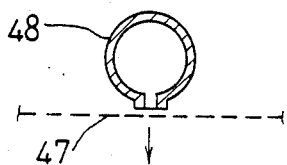
FIG. 10 is a section taken on line X—X of FIG. 9.

A fourth embodiment will be described hereinafter with reference to FIGS. 9 and 10. Common elements in the third and fourth embodiments are affixed with the same references and their description is not repeated.

The fourth embodiment differs from the third embodiment in the specific construction of classifier 14A. The classifier 14A shown in FIG. 9 includes a sieve 47 comprising a metal netting, a porous sheet or the like and extending over an upper inside area of the case 36, and a rotary nozzle 48 disposed downstream of the sieve 47 and having a slit outlet opposed to the sieve 47. The rotary nozzle 48 is operatively connected to an electric motor 49, and also connected to the blower 18 through a rotary joint 51 and a passage 50 having a variable throttle. Thus, gas jets from the rotary nozzle 48 are applied to a substantially entire area of the sieve 47 to prevent its clogging.

Figure 11:
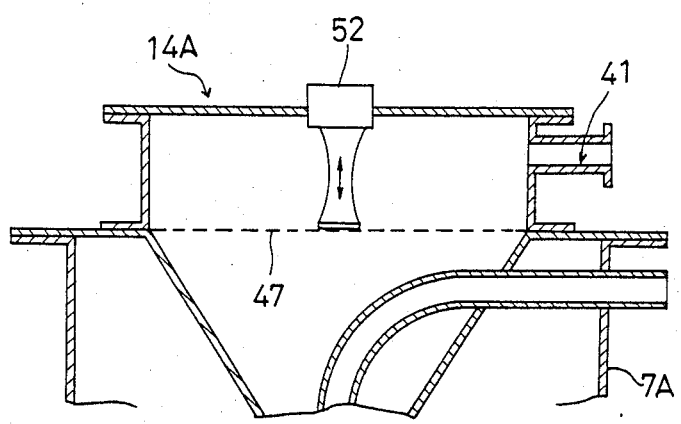
FIG. 11 is an explanatory view of a fifth embodiment.
Figure 12:
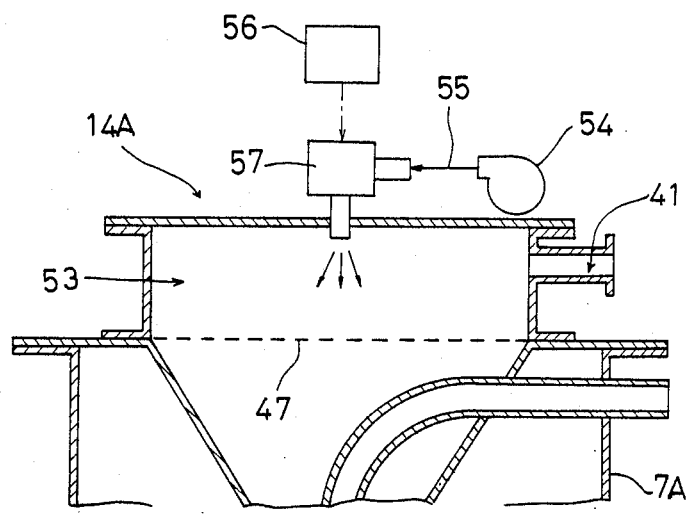
FIG. 12 is an explanatory view of a sixth embodiment.

Various other means may be employed for preventing clogging of the sieve 47. For example, as in a fifth embodiment shown in FIG. 11, the sieve 47 may be contacted by an oscillating piece of an ultrasonic oscillator 52, wherein the clogging is prevented by vibrations of the sieve 47. FIG. 12 shows a sixth embodiment wherein a space downstream of the sieve 47 is in communication with a pressure line 55 extending through an electromagnetic valve 57 to a compressor 54. The valve 57 is opened and closed with a short frequency by a controller 56 to cause pressure variations in that space. This results in impacts applied to the sieve 47 for preventing its clogging. Furthermore, though not shown, an ultrasonic wave generator may be provided to transmit an ultrasonic wave toward the sieve 47 thereby to cause its vibration.

The foregoing third to sixth embodiments may be modified in various ways. For example, the tubular partition 42 and ring-like partition 43 may be provided to be rotatable with the pulverizing members 9. The tubular partition 42 and ring-like partition 43 may comprise separate elements, i.e not integral with each other, the tubular partition 42 being fixed to the case 36 leaving only the ring-like partition 43 to be rotatable. Further, a drive mechanism may be provided exclusively for the tubular partition 42 and ring-like partition 43.

A seventh embodient of the invention will be described next with reference to FIGS. 13 and 14. The elements in this embodiment already described in relation with the precedidng embodiments are affixed with the same references wherever possible to facilitate understanding.

Figure 13:
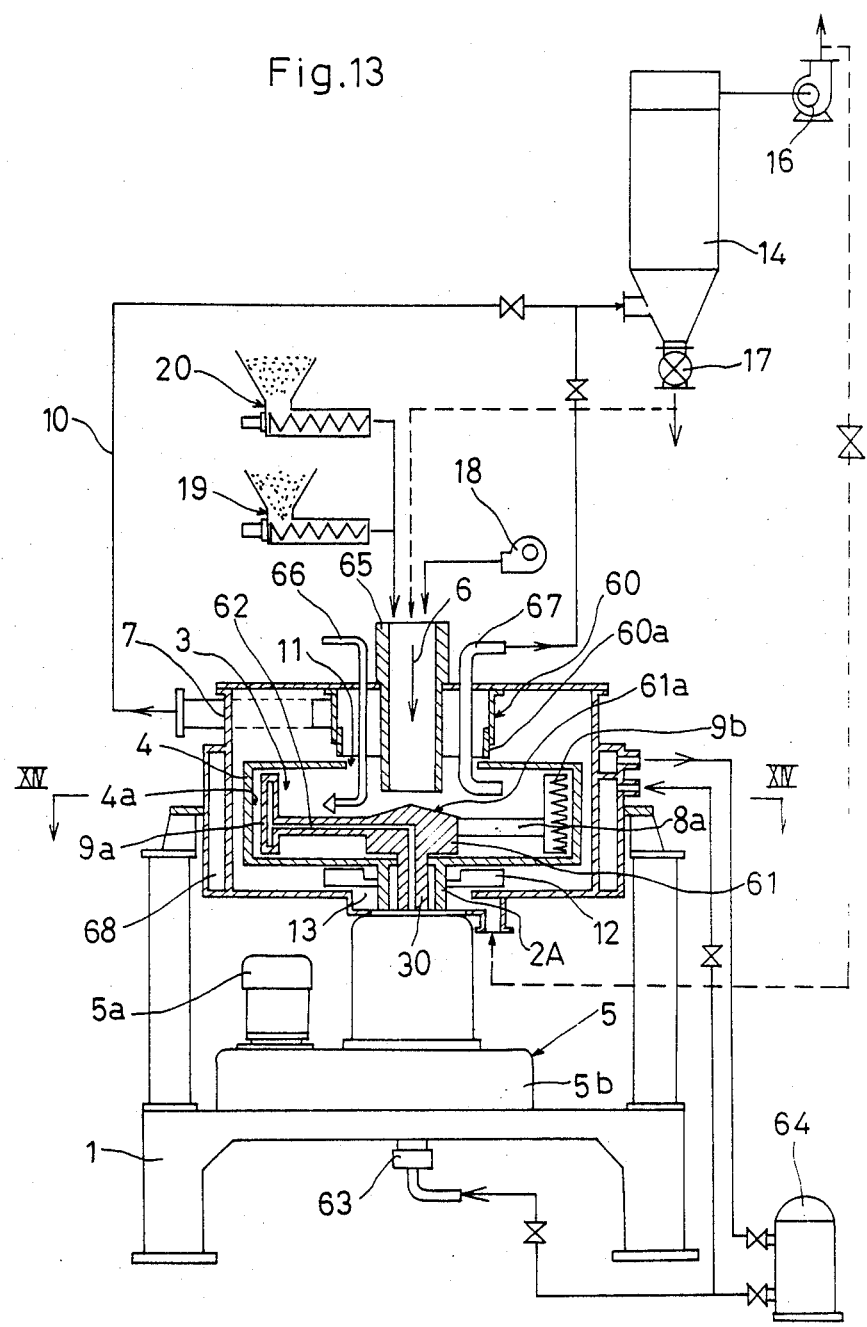
FIG. 13 is a schematic view, in vertical section, of a treating apparatus and peripheral equipment according to a seventh embodiment of the invention.
Figure 14:
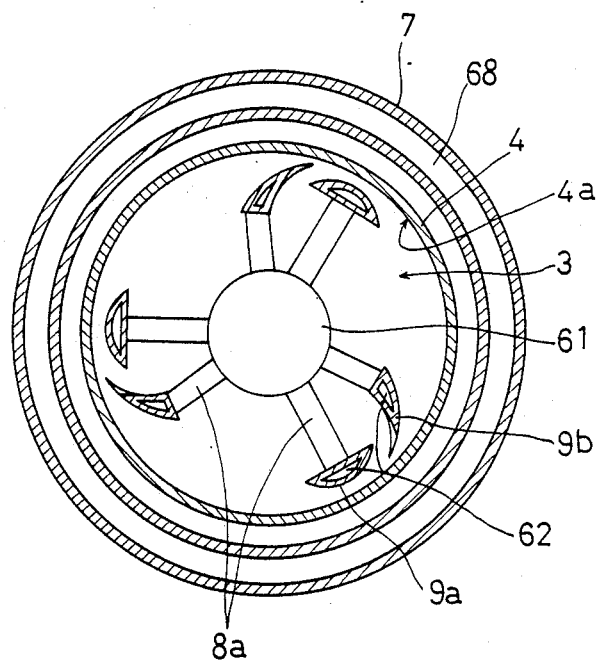

The apparatus shown in FIGS. 13 and 14 comprises a base 1, a vertical tubular rotary shaft 2A attached to the base 1, and a treating chamber 3 defined by a bottomed cylindrical casing 4 concentrically mounted on an upper end of the tubular rotary shaft 2A. The tubular rotary shaft 2A is driven by a drive mechanism 5 connected to a lower end thereof and consisting of an electric motor 5a and a speed changer 5b, whereby the casing 4 is rotatable to direct a material under treatment by centrifugal force against a peripheral inside wall surface 4a thereof. The rotational speed of the casing 4 is adjustable to impart an appropriate centrifugal force according to the characteristics of material to be treated.

The casing 4 is surrounded by a cover 7, and includes a fan 12 formed integrally therewith at a lower portion for drawing ambient air through a suction inlet 13 defined in the cover 7, thereby to cool the casing 4. The suction air ultimately flows, as pneumatic conveying medium for entraining pulverized material, into a material withdrawal passage 10 connected to the cover 7. The casing 4 defines an overflow type discharge opening 11 at an upper center thereof for permitting discharge of the material from the treating chamber 3 into the cover 7. A barrier 60 is provided directly over the discharge opening 11 to constitute one example of means for limiting overflows of the material. The barrier 60 is defined by a tubular member 60a lockable to selected positions in the vertical direction for varying overflow quantities. This apparatus may be adapted for batch operations by closing the barrier 60 or the withdrawal passage 10, and by replacing the fan 12 with cooling and heating means comprising a jacket or the like to be described later. In this case, the treated material is withdrawn from the treating chamber 3 by a sucking force applied through a pipe connected to an external suction device, the pipe being introduced into the treating chamber 3 after a treating operation is completed.

A vertical rotary shaft 30 coaxially extends through the tubular rotary shaft 2A and has an upper end thereof disposed in the casing 4. This upper end is provided with a support 61 defining an upwardly pointed central conical portion 61a. The support 61 includes support elements 8a extending therefrom and carrying, at distal ends thereof, friction members 9a and scraping members 9b arranged in the treating chamber 3 at suitable intervals in the direction of rotation of the casing 4. The friction members 9a and scraping members 9b constitute one example of means operable in combination with the inside wall surface 4a of the casing 4 to compress, rub, scrape, distribute and agitate the material under treatment. The friction members 9a define inclined surfaces approaching the casing 4 in the direction of rotation of casing 4. Conversely, the scraping members 9b are wedge-shaped or of a shape of comb tooth defining planes of action receding from the casing 4 in the direction of rotation of casing 4. The rotary shaft 30 defines a passage 62 for permitting a heating or cooling medium to flow to the support elements 8a, the friction members 9a and the scraping members 9b. The passage 62 is connected through a rotary joint 63 to an external tank 64 for storing the medium.

The rotary shaft 30 is driven by the drive mechanism 5 so that the friction members 9a and scraping members 9b are revolvable relative to the casing 4 with a fixed speed difference with respect to the rotation of casing 4. Thus, fixed compressive force and frictional force are applied to particulate material layers by causing the friction members 9a and scraping members 9b to revolve concentrically with the casing 4 at a slightly slower speed than and in the same direction as the casing 4. The friction members 9a and scraping members 9b may be stopped as necessary to increase the relative speed and the agitating force. The friction members 9a and scraping members 9b may suitably be varied with respect to their shapes, material, number and so on.

The cover 7 supports, centrally thereof, a pipe 65 defining a passage 6 for downwardly feeding the material toward the conical pattern of the support 61, and, in upper portions thereof, a feed nozzle 66 for directing water, oil or the like toward the inside wall surface 4a of the casing, and a suction pipe 67 for withdrawing the material remaining in the casing 4. The cover 7 is surrounded by a jacket 68 for receiving the heating or cooling medium in fluid form.

In order to permit this apparatus to operate continuously, the passage 10 is connected to a classifier 14 and then to a blower 16. The classifier 14 has an outlet connected through a rotary feeder 17 to the feed passage 6 to return insufficiently treated material for further treatment.

A blower 18 for feeding a suitable amount of air, inert gas or the like heated or cooled as necessary, and a feeder 19 for feeding the material to be treated, are also connected to the feed passage 6. A further feeder 20 is connected to the feed passage 6 for feeding thereinto a material pulverized in a separate process. Thus, the invention may employ an optimal feeding mode in accordance with the material to be treated.

This apparatus is capable of treating particulate materials used in various fields such as paints, powder paints, pigment coats, toners, printing and transfer materials, foods, feeds, fertilizers, medicines, industrial chemicals, ultraviolet sterilization, germicidal agents, deodorants, perfumes, cosmetics, clothing materials, cements, mold lubricants, plastics shaping materials, paper additives, electromagnetic wave absorbers, extreme infrared ray materials, electrostatic charge controllers, disk materials, liquid crystal materials, and dusts and aerosol for industrial testing.

Various embodiments have been conducted using the apparatus according to the seventh embodiment, as follows:

EXPERIMENT 1

Titanium oxide having 0.01–0.2 micron particle sizes and ferric oxide having a 0.005 micron average particle size were mixed in the ratio of 1:99 by complete fine mixing. The mixture did not separate in water or in oil, and no seperation was detected after a long storage period. Thus, the apparatus may be used for mixing or compounding pigments, cosmetics and the like.

EXPERIMENT 2

Ultrafine particles of mica, titanium oxide, alumina, silicone oxide and colloidal silica were mixed, granulated and dried. The mixing ratio and particle sizes of these materials were as set hereunder. The product may be pigments, paints, cosmetics, standard powder or the like.

| Mica | average part. size | 0.6µ | 40% |
| --- | --- | --- | --- |
| Titanium oxide | " | 0.1µ | 15% |
| Alumina | " | 0.1µ | 5% |
| Silicone oxide | " | 0.05µ | 20% |
| Coloidal silica | " | 0.0015µ | 20% (solid) |
| | Concentration: 20% | | |

Figure 15:
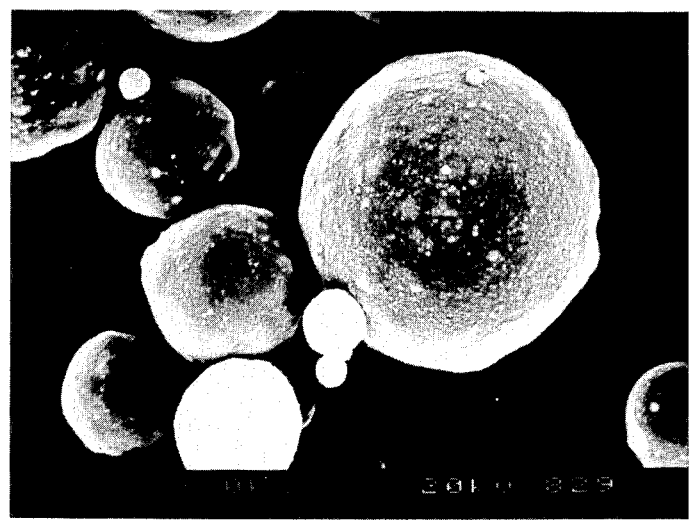
FIG. 15 is a micrograph ($\times 8000$) of granules obtained in Experiment 2.

Temperature: 180°–250° C.
Product: 1–100 micron spherical granules (FIG. 15).

EXPERIMENT 3

Figure 16:
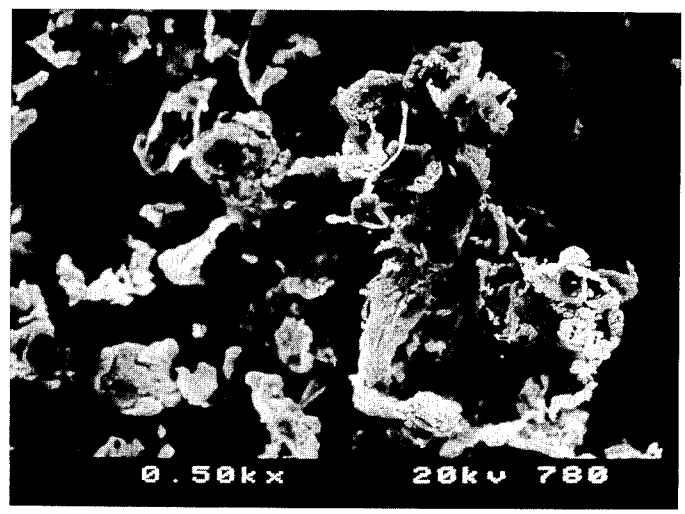
FIG. 16 is a micrograph ($\times 500$) of fibers of tetrafluoro-ethylene resin used in Experiment 3.
Figure 17:
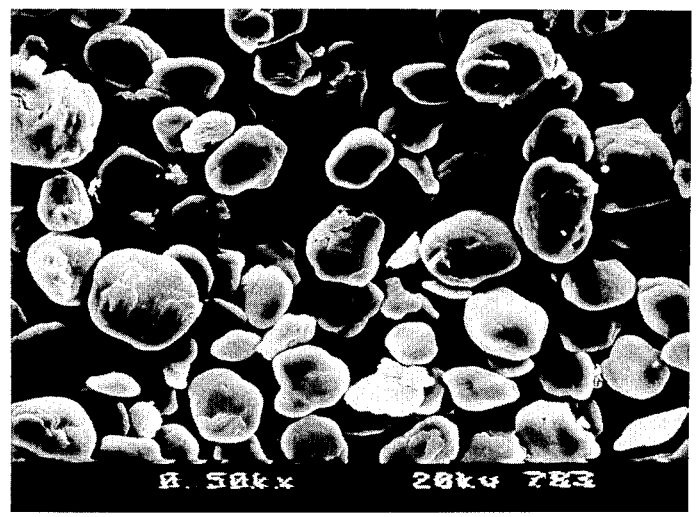
FIG. 17 is a micrograph ($\times 500$) of granules formed five minutes after starting an operation in Experiment 3.
Figure 18:
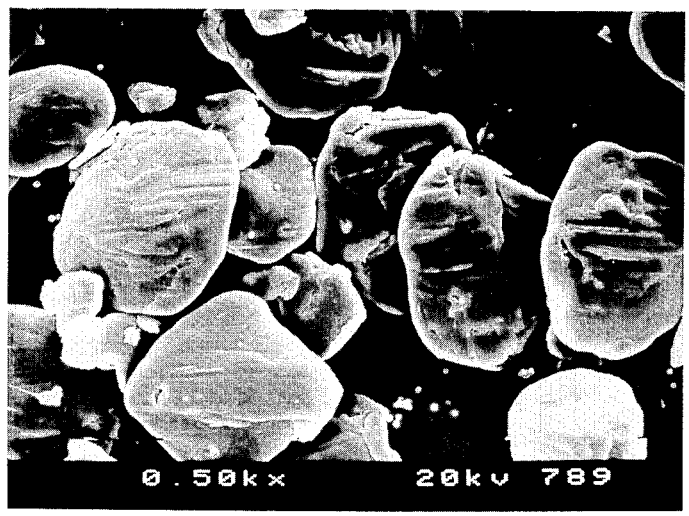
FIG. 18 is a micrograph ($\times 500$) of granules formed forty minutes after starting the operation in Experiment 3.

Spongy and fibrous tetrafluoroethylene resin was rounded into spherical and ellipsoidal forms. The material having polygonal, spongy and fibrous shapes of 20–100 microns (FIG. 16) was rounded into spherical and ellipsoidal shapes of 10–30 microns in five minutes (FIG. 17) and was flattened into elliptic and circular shapes of 30–60 microns in forty minutes (FIG. 18). The product may comprise plastics shaping materials and toners.

EXPERIMENT 4

Figure 19:
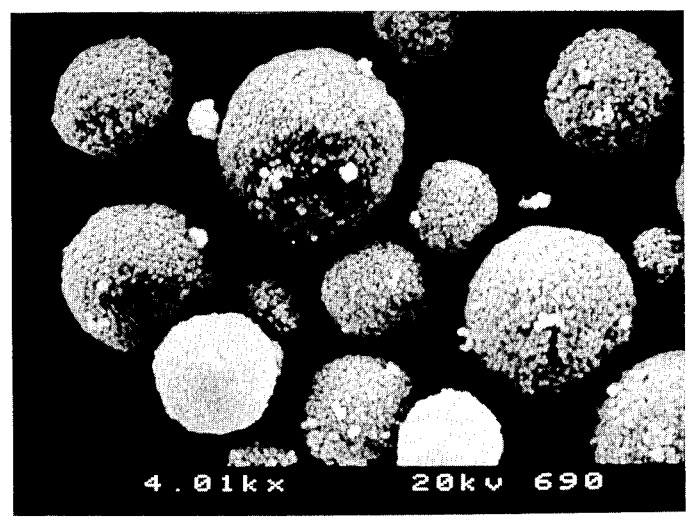
FIG. 19 is a micrograph ($\times 4000$) of cosmetics granules obtained in Experiment 4.

Spherical polyamide resin having 3–15 micron particles sizes was coated with titanium oxide powder having 0.1–0.2 particle sizes by static electricity and thermosoftening (FIG. 19). The product comprises cosmetics.

EXPERIMENT 5

Figure 20:
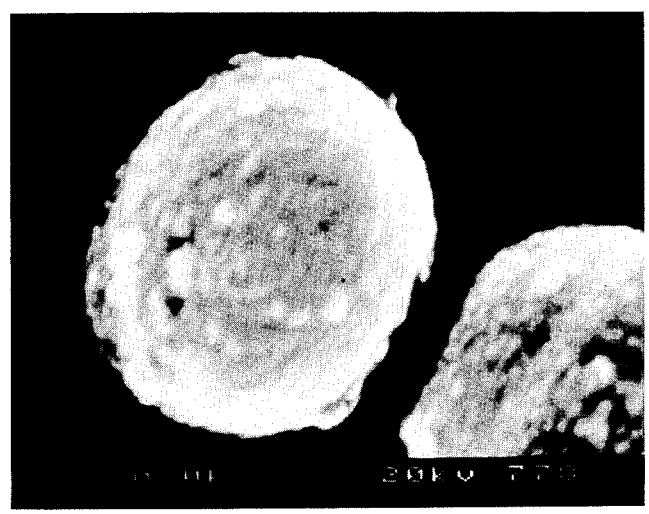
FIG. 20 is a micrograph ($\times 30000$) of cosmetics granules coated in Experiment 5.

Spherical silicone resin having a 2 micron average particle size was coated with titanium oxide having a 0.015 micron average particle size. First, spherical surfaces of silicone resin were activated by friction, and then titanium oxide was added and coated thereon by compression (FIG. 20). This coating process changed from hydrophobic to hydrophilic.

EXPERIMENT 6

Figure 21:
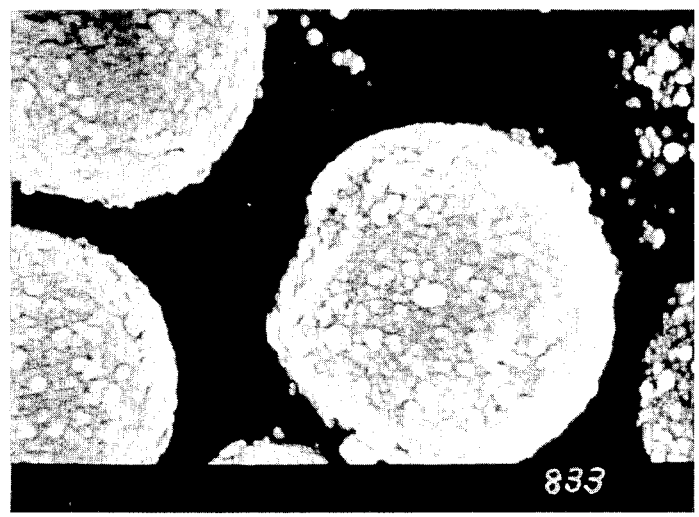
FIG. 21 is a micrograph ($\times 30000$) of cosmetics granules coated in Experiment 6.

The product of Experiment 5 consisting of the spherical silicone coated with titanium oxide was further coated with ferrous oxide (FIG. 21). Fatty acid was used as dispersant for the ferrous oxide which had a 0.005 micron average particle diameter. The product which had changed hydrophilic with the coating of titanium oxide became hydrophobic again with increased oil absorption. This product may be used as cosmetics, mold lubricants, pigments, etc.

EXPERIMENT 7

Figure 22:
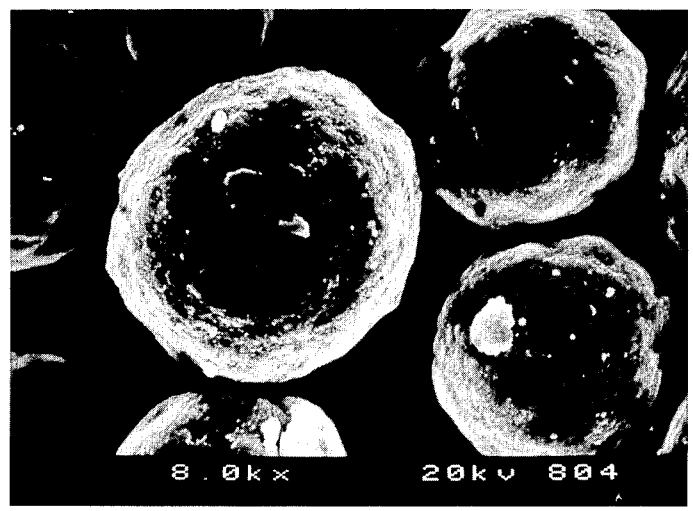
FIG. 22 is a micrograph ($\times 8000$) of cosmetics granules coated in Experiment 7.

Spherical polymethylmethacrylate having a 6.7 micron average particle size was coated with titanium oxide having a 0.015 micron average particle size (FIG. 22). When the casing temperature exceeds the glass transition point of polymethylmethacrylate and the surface temperature of polymethylmethacrylate approaches 200° C., its surface portions begin to knead with titanium oxide. As the operation continues, titanium oxide becomes dispersed into polymethylmethacrylate interior. The compound material thus produced comprises sherical particles having negative static electricity, zero angle of repose, and excellent dispersibility. This product may be used as dusts and aerosol for industrial testing in addition to cosmetics, toners, pigment bases, and paints.

As proved through these experiments, the particulate treating apparatus according to the seventh embodiment of the invention produces the effects set out hereunder.

The casing 4 is rotated at high speed to impart a centrifugal force to press the particulate material against the inside surface 4a of the casing 4 and form layers of the material thereon. The layers thus formed are pressed and rubbed by the friction members 9a defining spaces with the inside surface 4a narrowing in the direction of rotation, and are then scraped by the scraping members 9b. Through the resulting dispersion and agitation, the material is reliably mixed, granulated, rounded, coated, and encapsulated as follows.

Regarding the mixing first, plural types of particulate material fed into the casing 4 are formed into layers suitably dispersed or seperated from one another along the inside surface 4a of the casing. The friction elements 9a press and rub surfaces of the layers. Particles subjected to the friction with the contacting surfaces of the friction members 9a are partially dispersed and driven inwardly of the layers. Thereafter, the scraping members 9b impart a total agitating action. In other words, the friction members 9a have the two functions to loosen secondary and tertiary aggregations at layer surfaces through the above partial dispersion, and to cause cohesion and compression of the loosened and activated particles. These functions are repeated to promote mixing of the particles, and the mixing is further promoted through the agitating and dispersing action applied in the subsequent step by the scraping members.

Regarding the granulation, a material having a low fusing point is added in a small amount at the above mixing operation with an addition of water, oil or heating means as necessary. This causes the materials to begin aggregation, which become granulated through the agitation and rolling movement within the casing 4. The granulated product will have the greater particle size the slower the casing 4 rotates, and grow into granules with residence time.

Regarding the rounding, the rounding here means rounding of individual particles as distinct from rounding of aggregates produced by the above granulating operation. Fibrous or spongy high polymer organic materials, deformed plastics and the like are softened and rounded by friction heat produced when the materials are subjected to the compressive friction with the friction members 9a.

Regarding the coating, a material for forming the core and a coating material in ultrafine particles are mixed as prior to feeding to the casing 4. Particles of the core material are surfacially activated by local friction applied by the friction members 9a. These surfaces of the core material particles are coated with the ultrafine particles of the coating material strongly adhering thereto by a mechanochemical action, the ultrafine particles being surfacially activated after the aggregates are dispersed by the compression and friction applied by the friction members 9a. Where the core material comprises a high polymer organic material, surfaces of the core material particles become soft and begin to knead with particles of the coating material. The coating material particles become increasingly dispersed into interiors of the core material particles with the passage of time. In this way, the core material particles and the coating material particles become integrated into new particles having characteristics totally different from those of the core material particles and the coating material particles.

The particle surfaces may be coated by adding a colloidal material as encapsulating agent and binder, and the core material is granulated and dried at the same time, thereby to readily encapsulate the material.

In the case of material having a low fusing point, the material is fused by the friction heat and heating means, and the particles are allowed to cool while being coated, to become encapsulated.

In particular, the casing and the friction members are heated while the core material is compressed, rubbed, agitated and dispersed within the casing. An encapsulating liquid is poured into the casing having a certain temperature. After volatile portions of the encapsulating liquid evaporate completely, the heating is stopped to allow the material to cool into an encapsulated product.

Consequently, with regard to the mixing, a high precision mixing including very small particles is now made possible which was heretofore impossible. This eliminates possibility of the materials separating again after the mixing, and enables mixing of the materials which were not mixable in the prior art.

With regard to granulation, the invention provides for an excellent granulating operation to achieve fine particles sizes of 50 microns and less which was not possible with the known apparatus. The product thus achieved has strong cohesion.

With regard to rounding, fibrous and polygonal or deformed materials may now be rounded to a satisfactory degree.

With regard to coating, it is now possible for the surfaces of material particles to be coated with fine particles through kneading therewith. For example, a core material comprising a high polymer organic material or an inorganic material such as silica and having 1–50 micron diameters may be surfacially coated through kneading with titanium oxide, ferrous oxide, pigment or other organic or inorganic compound in ultrafine particles of 0.001-5 microns. It is also possible to provide a product by adding and coating the fine particle surfaces with a colloidal material and allowing the materials to dry in this state.

With regard to encapsulation, the material may be encapsulated by adding a colloidal material as encapsulating agent and binder or other encapsulating materials such as a low fusing point material, and allowing the compound to dry or cool. A finely granulated product is now obtained by mixing the materials to the finest parts at an extremely low temperature utilizing liquid nitrogen for enclosing a low temperature volatile material with an encapsulating material, for example, enclosing cosmetics with cyclodextrin, and for compounding the material with fine particles of pigment, resin and the like.

In describing the first to sixth embodiments, the pulverizing operation has been taken for example of particulate material treatment. These embodiments may be modified by replacing the pulverizing members 9 with the friction members 9a and scraping members 9b and providing, as necessary, the water or oil supply nozzle 66 and jacket 68. Then, the first to sixth embodiments, like the seventh embodiment, may be used for mixing, granulating, rounding, coating or capsulating particulate materials. Conversely, the seventh embodiment may be adapted for use as a pulverizing apparatus by replacing the friction members 9a and scraping members 9b with the pulverizing members 9.

In all of the first to seventh embodiments, the casing 4 is rotatable on a vertical axis. However, this construction may be varied so that the casing 4 is rotatable on an inclined axis. If circumstances require, the apparatus per se may be the horizontal type with the casing 4 rotatable on a horizontal axis.

We claim:

1. An apparatus for treating a particulate material comprising;
   a casing (4) defining a treating chamber (3) having a discharge opening (11) for permitting overflows of the material under treatment,
   drive means (5) for rotating the casing (4) at high speed to produce a centrifugal force for pressing the material in the casing (4) against an inside wall surface (4a) of the casing (4),
   treating means (9, 9a, 9b) disposed in the casing (4) to be rotatable relative to the inside wall surface (4a) of the casing (4),
   a classifier (14, 14A) communicating with the discharge opening (11),
   a housing (7) which encompasses said casing (4) and which forms an enlarged discharge area for receiving overflows of material, an axially aligned particulate material inlet (6) extending from above said casing (4), and
   said discharge opening (11) surrounds said inlet (6), said discharge opening (11) is disposed adjacent a center of rotation of the casing (4) and discharges overflows of material into said enlarged discharge area, and limiting means (21, 42a, 60) is provided adjacent the discharge opening (11) within said casing (4) radially outwardly of said inlet and of said discharge opening (11) for limiting the overflows of material under treatment.

2. An apparatus as claimed in claim 1 in which said limiting means comprises classifying vanes (21).

3. An apparatus as claimed in claim 2 in which said classifying vanes are revolvable coaxially with and in a peripheral direction of the casing (4).

4. An apparatus as claimed in claim 3 in which said classifying vanes (21) are attached to the casing (4), and the treating means (9, 9a, 9b) is revolvable coaxially with and in the peripheral direction of the casing (4).

5. An apparatus as claimed in claim 4 in which said treating means comprises pulverizing members.

6. An apparatus as claimed in claim 4 in which said treating means comprises friction members (9a) and scraping members (9b).

7. An apparatus as claimed in claim 1 in which said discharge opening (11) is defined by a tubular partition (42), and the limiting means comprises an annular projection (42a) defined on an inside wall of the tubular partition (42).

8. An apparatus as claimed in claim 7 in which said tubular partition (42) is continuous with a lower ring-like partition (43), the tubular partition and ring-like partion (42, 43) being rotatable coaxially with and in the same direction as the casing (4), and that the classifier (14, 14A) is directly connected to the casing (4), the tubular partition (42) defining a coarse particle return passage (44) extending from the classifier (14, 14A) to the casing (4).

9. An apparatus as claimed in claim 8 in which said ring-like partition (43) is attached to the casing (4) through vanes (45) acting to throw coarse particles toward the inside wall surface (4a) of the casing (4), and the treating means (9, 9a, 9b) is revolvable coaxially with and in the same direction of the casing (4).

10. An apparatus as claimed in claim 9 in which said treating means comprises pulverizing members.

11. An apparatus as claimed in claim 9 in which said treating means comprises friction members (9a) and scraping members (9b).

12. An apparatus as claimed in claim 1 in which said limiting means comprises a barrier (60).

13. An apparatus as claimed in claim 12 in which said casing (4) and the treating means (9, 9a, 9b) includes heating and cooling means.

14. An apparatus as claimed in claim 13 in which said treating means comprises friction members (9a) and scraping members (9b).

15. An apparatus as claimed in claim 1 in which said treating means comprises friction members (9a) and scraping members (9b), the friction members (9a), the scraping members (9b) including heating and cooling means.

* * * * *